Patented Oct. 28, 1924.

1,513,615

UNITED STATES PATENT OFFICE.

HERBERT T. LEO, OF ST. JOSEPH, MISSOURI, ASSIGNOR TO HAZEL MARY LEO, OF TOPEKA, KANSAS.

DRY-POWDER JELLY BASE CONTAINING PECTIN.

No Drawing. Application filed April 26, 1921. Serial No. 464,752.

*To all whom it may concern:*

Be it known that I, HERBERT T. LEO, a citizen of the United States, and a resident of St. Joseph, in the county of Buchanan and State of Missouri, have invented a Dry-Powder Jelly Base Containing Pectin, of which the following is a full, clear, and exact description.

This invention relates to a new method or process for producing pectin, the basis of all jellies.

The invention has for its object the production of a purified pectin in powdered or granular form which is free from acid or sugar or any other foreign substance.

Another object of the invention is the provision of a powdered pectin product which is far superior in pectin content to others in use.

A further object resides in the provision of a process whereby bodies containing pectous substances may be made use of in their natural state and at any convenient period in their development for the purpose of producing pectin.

A still further object resides in certain other steps in the process which result in an economical, efficient process whereby pectin can be made available in the form above mentioned.

It is well known in the art that certain fruit, vegetable and other plants contain pectous substances. For example, apples contain pectous substances in the form of pectose, which, later on in the development of the apple, as it ripens, is transformed or converted into pectin. Within the apple, for example, are a multitude of cells. Of course, this cellular formation is common to substantially all plant, vegetable and fruit life. These cells are formed of cellulose material and within them is contained, in the apple, such substances as acid, sugar, etc. The pectous products are contained in the intercellular space. When the apple first commences to develop, practically all the pectous substances are in the form of pectose, and there is present a small amount of pectase. This pectase is in the nature of an enzyme, or a ferment, which gradually acts upon the pectose to convert it into pectin.

During the time that the pectase is converting the pectose into pectin, it is to be noted that the acid within the apple is not affecting this conversion, because it is contained within the cells. However, if any of the cells become broken and the acid is liberated to come in contact with the pectous products, this conversion is immediately stopped, since the conversion of pectose into pectin by pectase cannot take place when an acid is present.

For the manufacturer of jellies who desires to avail himself of any form of vegetable or fruit containing pectous substances which at the same time also contains acid, it is absolutely essential to get rid of the acid in some way or other. However, in order to make use of the pectous products, it is also necessary to get them into solution. This is possible only by crushing or breaking up the cells, whereupon the pectous substances go into solution in the juice of the apple.

My process particularly, then, relates to a provision whereby the apple, fruit, vegetable, or other plant, may be made use of at any period of its development and treated in such manner as to result in a maximum yield of pectous products in a dry powder form and by a minimum number of simple steps, whereby economy of manufacture is achieved. In the first step of the process, I desire to avail myself of the ferment pectase, and to this end I take any non-acidulous substance containing pectin, of which carrots are representative, and extract the pectase therefrom in any suitable or known manner. It is preferable to extract the pectase, although it is perfectly possible and feasible to use the whole of the vegetable, such as carrots, without separating the pectase therefrom. The pectase will remain in solution actively in this non-acidulous body, whereby it is available for the treatment of other pectous substances.

After having produced the pectase or fermenting substance, I take the fruit pulp to be treated, such as apples, either before or after the cider has been pressed therefrom, and proceed as follows: If the fruit or vegetable or plant is acidulous, I extract or neutralize the acid. To extract the acid, it is merely necessary to add cool water, whereupon the acid goes into solution and can be separated from the rest of the substance. However, it is preferable to neutralize the acid instead of to extract it, because by neutralizing it certain advantageous results are achieved. I prefer in neutralizing the acid to use calcium carbonate in any desired proportion.

The next step in the process is to break up the cells, if they are not already broken up, whereupon any pectin, pectose, some pectase, and possibly the calcium salts contained in the fruit, go into solution. The apples or pulp are cooked in boiling water until all the cells are broken up, then the calcium carbonate above referred to is added in the desired amount. The calcium carbonate can, however, be added before the cooking, if desired. The main idea is to have the calcium carbonate in the solution during cooking. The cooking takes place at about five pounds pressure and at a temperature not higher than 230° F. for about a period of an hour.

After this takes place, the liquor is allowed to cool to 115° F. At this time, and while this matter is maintained at this temperature of 115° F. for about one to two hours, the desired amount of pectase, or ferment, is added. The amount of pectase added is about 1/1000 part. The temperature is not allowed to go above 115° F. for the reason that the converting action of pectase is destroyed above 160° F. Any temperature below 160° F. will be proper although not so satisfactory. The action of the pectase is generally sufficiently effective in about fifteen minutes.

After the period of one or two hours, the liquor is pressed out in any suitable way, and the pectous bodies pass out with the juice. The solution or liquor is then clarified by filtering, and may be decolorized by the use of carbon, although this is not essential. It is also preferable, although not essential, to concentrate by evaporation in any suitable manner. The desired degree of concentration is generally between 5° and 10° Bé.

This concentrated solution is then treated with alcohol, which results in the precipitation of the pectous bodies. This alcohol may be ethyl or methyl alcohol or a combination of both, as desired. Preferably three gallons of alcohol are added to each gallon of concentrate. The solid pectous bodies precipitated from the solution are separated therefrom, preferably in a centrifugal machine, and are then perfectly dried by the well-known atomizing process, which results in the blowing of the material into a room, whereby it immediately forms into a dry powder, which can be collected and sold. Any other suitable drying process can be used, if desired. The reason why the atomizing process is used is because the resultant powder is a very fine powder; whereas, if the product were dried by allowing it to evaporate or dry in a room in receptacles or on the floor, the resultant product would be, of course, crystalline powder, which is not always desired.

This dry powder is a pectous body comprising from 95% to 100% of the following ingredients: pectin, pectose, a small amount of pectase, and some calcium pectate. All of these bodies aid and take part in the formation of pure fruit or vegetable jelly, as distinguished from so-called jellies made of gelatine.

When the solution containing the pectous substances is treated with alcohol to precipitate them out of the solution, the sugar previously in solution is separated from the pectous bodies by reason of the fact that sugar is not precipitated by the alcohol. It, therefore, is observed that the acid contained in the fruits or substances treated is eliminated by extraction or solution in the manner above described, and that the sugar content is eliminated from the pectous substances because they are precipitated by an agent which does not precipitate the sugar at the same time.

The essential part of the process is the treatment of acidulated pectous bodies in such manner as to neutralize or eliminate the activity of the acid and then to treat these substances with pectase, followed by the separation or precipitation of the pectous product from the solution without carrying the sugar content over with them.

A further essential feature of the process is that by eliminating the acid during the time that the pectase or ferment is in action on the pectous product the pectase is thereby free to transform the maximum amount of pectous bodies into pectin and calcium pectate. These two ingredients are forms of the pectous product which are highly desirable for the purpose of making jellies. It has been found by many tests and experiments that by so regulating and controlling the production of the pectin and calcium pectate the character of these products can be to a great extent standardized so that the jellifying capacity of the pectin powders thus formed is remarkably increased over the capacity of any that are now known or used. For example, a pound of powder prepared in accordance with my process is easily capable of jellifying from 80 to more than 100 pounds of sugar in the presence of the proper amount of acid, whereas the pectous products hitherto used for the purpose of making jelly have only had the sugar jellifying capacity of around 60 or 65 pounds. The reason why these previously prepared products have not been capable of jellifying to such a high degree is merely because their character was not controlled. The pectous bodies used were more in the nature of the mother substance and were not to such a high degree the calcium pectate and the pectin. It is an obvious conclusion, therefore, to draw from the actual capacity of my process that by having a considerably more definite control over the character of the products which I produce, I can put on the market a powder which will be standardized to a much higher degree, so that in every package which I sell the character of the pectous products and their capacity to jell with sugar is much more definitely known, so that the housewife can add to each package a definite quantity of sugar or acid or both and be sure that a high grade of jelly will be the result. Not only is this certainly achieved by my process but a much greater quantity of jelly can be made from a given quantity of pectous products than before, which in itself is a very great advantage in favor of my product.

What I claim is:

1. A process of treating bodies containing pectous substances, which comprises treating said substances with pectase in the absence of acids.

2. The process of treating bodies containing pectous substances and acid, which comprises eliminating the activity of the acid and then treating the remaining substances with pectase.

3. The process of treating bodies containing pectous substances and acid, which comprises, first, treating the substances with an agent to neutralize the acid, and then treating the remaining substances with pectase.

4. The process of treating bodies containing pectous substances and an acid, which comprises, first, the addition of an agent to eliminate the activity of the acid, second, treating the substances with pectase, and, third, precipitating the pectous products by an alcohol.

5. The process of treating bodies containing pectous substances, which comprises treating the substances with pectase in a substantially neutral solution, and then precipitating the pectous products with alcohol.

6. A purified pectin and calcium pectate substance freed from acids and produced in a dry powder or granular form, a given quantity of said powder being capable of jellifying with from eighty to one hundred parts of sugar.

7. The process of treating substances containing pectous substances, which comprises getting said substances into solution, eliminating the activity of any acid present, treating said substances with pectase, precipitating the pectous products with alcohol, separating the pectous products from the solution, and then drying the pectous products to produce a dry powder.

HERBERT T. LEO.